United States Patent
Kenworthy et al.

(10) Patent No.: US 8,297,363 B2
(45) Date of Patent: Oct. 30, 2012

(54) DEVICE AND METHOD FOR IMPROVING LIQUID REMOVAL FROM GAS, CONDENSATE AND OIL WELLS WHEN USING A MULTI-CHANNEL SYSTEM

(75) Inventors: Michael W Kenworthy, Chester, VT (US); Boris Ganelin, Brooklyn, NY (US)

(73) Assignee: Technology Commercialization Corp., Chester, VT (US)

( * ) Notice: Subject to any disclaimer, the term of this patent is extended or adjusted under 35 U.S.C. 154(b) by 350 days.

(21) Appl. No.: 12/828,445

(22) Filed: Jul. 1, 2010

(65) Prior Publication Data
US 2012/0000670 A1    Jan. 5, 2012

(51) Int. Cl.
*E21B 43/12*    (2006.01)
*E21B 17/18*    (2006.01)
(52) U.S. Cl. ..................... 166/372; 166/242.3
(58) Field of Classification Search .............. 166/369, 166/372, 313, 242.3; 137/561 A
See application file for complete search history.

(56) References Cited

U.S. PATENT DOCUMENTS
1,354,027 A * 9/1920 Crowell ............... 137/630.14
5,950,651 A    9/1999 Kenworthy

OTHER PUBLICATIONS

Rao, B. Designing Coiled Tubing Velocity Strings. Technical notes. CTES, L.C. Apr. 9, 1999.

* cited by examiner

*Primary Examiner* — Giovanna Wright
(74) *Attorney, Agent, or Firm* — Boris Leschinsky

(57) ABSTRACT

The present invention is used in conjunction with a multi-channel system of a production string for deployment in gas, condensate or oil wells. An end-piece is placed at the entrance to such multi-channel system. It includes a semi-enclosed space helping to increase the proportion of gas phase entering the system at its bottom entrance. Increased proportion of gas allows lifting liquids and/or solids from the wellbore with greater efficiency. Examples of using the invention include wellbore water removal for gas wells with liquid loading problems, for solution gas drive or gas cap driven oils wells during their initial "natural flowing phase", or during gas re-injection or gas-lift recovery operations for oil wells. It can also be used for gas-lifting water in water wells.

21 Claims, 8 Drawing Sheets

DEVICE AND METHOD FOR IMPROVING LIQUID REMOVAL FROM GAS, CONDENSATE AND OIL WELLS WHEN USING A MULTI-CHANNEL SYSTEM

INTRODUCTION

The invention relates to methods and devices used to improve the performance of a multi-channel system in gas, condensate or oil wells. The multi-channel system or "MCS" may comprise one or more lengths of extruded or molded elastomeric, metallic or composite material tubing. It may also include a bundle of parallel individual tubes having two or more internal passageways running from its beginning to its end. Such system serves to divide the fluid flowing up the well into multiple flows for better removal of wellbore liquids and/or solids.

In one embodiment, an MCS is formed by extrusion, using any elastomeric material (e.g. thermoplastics, elastomers, polypropylene, vinyl, poly-vinyl chloride, etc.), including a composite of several materials (e.g. carbon fiber or wire rope added to the extrusion elastomeric material), or using any metal material (e.g. aluminum, etc.) suitable for such extrusion. The cross-section of such extrusion may be designed to segment the flow of production fluids up the well into two or more flows, reducing the individual flow channel diameter or cross-section area. This is turn causes an increase in the interaction between the carrier phase (gas) and the carried phase (liquid) in the multi-phase upward flow, resulting in more of the carried phase (liquid) produced at the surface.

Reference is now made to U.S. Pat. No. 5,950,651 entitled "METHOD AND DEVICE FOR TRANSPORTING A MULTI-PHASE FLOW" (the '651 patent) incorporated herein in its entirety by reference. The '651 patent explains in greater detail the physical principle whereby, in a gas/liquid mixture flowing in a conduit, the proportion of liquid in the multi-phase flow at the end of the conduit is greater when the flow is segmented into multiple flows of smaller cross-sectional areas. All cross-section designs for segmenting the flow described in the '651 patent are included in the present invention. FIG. 1 illustrates one example of such cross-sections having multiple small holes/conduits used in an MCS design configured for use in conjunction with the current invention. The diameter of such circular conduits may be selected based on the desired extent of interaction between the gas and liquid phases. While the liquid to gas ratio increases at the end of such conduit(s) with the increased segmentation of the flow into more and more individual passages, the flow restriction is increased as well. For different wells with various well conditions (wellbore pressure, well depth, liquid volume produced, fluid viscosity, types of liquid produced, etc.), the optimum number of passages and their diameter may have to be optimized individually.

Upon initial completion, most natural gas wells typically produce gas flow for a sustained period of time (often many years) without the need for any remedial lift systems to remove the buildup of liquid at the bottom of the well. Given sufficient reservoir pressure, the high flow velocity of gas near the bottom of the well will enable removal of produced water, oil or condensate and to carry and produce these liquids from the bottom of the well to its surface. Turner et al, developed and defined some predictive correlations which forecast the onset of liquid loading in producing natural gas wells. Turner introduced a term "critical velocity" which means the minimum gas velocity necessary to remove liquid from the well. Given sufficient gas velocity, liquid droplets will be carried and suspended in the gas stream from the producing reservoir interval to the surface of the well. As depletion of the well progresses, at some point the well fails to achieve the critical gas flow velocity and liquid loading ensues causing a possible need for using liquid removal technologies. Some of such wells are referred to as marginal wells.

An important source of supply of energy lies in the unproduced natural gas that remains in more than 260,000 marginal natural gas wells in the U.S. today, as estimated by the U.S. Department of Energy. Marginal gas wells or "stripper" wells are defined as wells that produce natural gas at very low rates (less than 60 thousand cubic feet of gas per day). As a result of normal reservoir depletion over time, all producing gas wells will eventually become stripper wells. The naturally-occurring increasing presence of liquids near the wellbore occurring over the life of the well reduces gas production even faster due to the hydrostatic buildup of liquids across the reservoir interval. This in turn causes reduced gas entry into the wellbore and increased back-pressure on the producing reservoir.

Significant quantities of natural gas reserves are left behind in wells because production costs become prohibitively high during the final stages of the extraction process. Well operators will typically opt to plug and abandon a gas well prematurely rather than make the investments needed to prevent liquid loading during the final stages of production in efforts to deplete the natural gas reserves. Some of the traditional liquid removal technologies include beam pumping, compression, plunger-lift, velocity strings, surfactant injection, gas lift, hydraulic pumps, casing swabs and so on. In general, the operating costs of these technologies are high because of energy requirements, labor, consumables and the wear and tear associated with the moving parts necessary to operate these systems.

Initially, gas-driven oil wells produce mostly liquid, with producing gas/liquid ratios increasing as depletion progresses during the "natural flowing phase" (pre artificial lift). Early in such natural flowing phase, annular gas-liquid flow appears near the wellhead, and as depletion continues, the height along the production tubing where such annular flow regime is initiated moves progressively lower and lower into the well until there is insufficient reservoir gas to provide the necessary energy to lift the liquid out of the well, and production stops. Annular flow is characterized by high gas/liquid ratios, and methods that can reduce this ratio have the effect of conserving the gas (energy source) in the formation, thus extending the natural flowing phase of the well. Conserving reservoir gas also maintains the low viscosity of reservoir petroleum liquids, increasing its ultimate recovery.

The natural flowing phase of an oil well is usually rather short, with only approximately 10% of the oil in the producing reservoir layer being recovered. Extending the natural flowing phase to achieve greater depletion before initiating artificial lift is clearly economically beneficial. Common practice is to initially use oil production tubing of 2 inches or more in inside diameter, sometimes switching to a smaller diameter tubing (~1 inch) toward the end of the natural flowing phase in efforts to extend its life (for example, see Designing Coiled Tubing Velocity Strings, by Bharath Rao, 1999). In annular flow, there is a correlation between the gas/liquid ratios in the flow at the end of a long conduit vs. the diameter of the conduit, such ratio decreasing with declining diameter.

When an MCS is deployed in a gas or oil well, it is preferably hung from the top of the well and extends as a continuous length down to a point just above the perforations where reservoir fluid enters the well. In other configurations, several MCS units can be used in series along the well or one can be used in a limited region of the well column. While fluids can be co-produced through the MCS and the annulus region to increase gas production (desirable in gas wells), preferably the well is produced only through the MCS string. As the gas-liquid fluid coming through the perforations enters the well and rises in the casing, the gas phase can either enter the small tube entrances comprising the MCS, or go around them and up the well to collect at the top of the casing (or annulus between original production tubing and the casing). Given the lower mass and viscosity of the gas phase vs. liquid, as well as the higher hydraulic resistance for fluids (liquids and gas) to flow into the small MCS tubes vs. the larger annulus area, the gas phase may preferentially flow around the small MCS entrances and go up the annulus. As the carrier phase, gas provides the energy to lift the liquid, and so increasing the concentration of the gas phase entering the MCS is highly desirable in efforts to improve the liquid producing capability of the MCS string, especially during the initial kick-off of a gas well (i.e. such as immediately after an MCS is installed when significant liquid accumulation exists in the wellbore).

Additionally, the small entrance holes at the bottom of an MCS are susceptible to damage or plugging when deployed in a well. While an MCS is lowered downhole during installation, it can catch on the joints of tubing or casing, preventing deployment to the desired depth or possibly damaging the bottom of the MCS. One method to accurately place the MCS bottom at just above the perforations is to install a collar or seat nipple at the desired depth and rest the bottom of the MCS on that seat nipple, but this could result in damage to the small tube entrances of the MCS, especially if the MCS is made of elastomeric material. Also, the MCS small tube entrances are susceptible to plugging by debris, such as small pebbles or aggregates coming from the reservoir given the continuous suction at the MCS small tubes entrances when the MCS string is producing.

The present invention comprises a combination of features and advantages that enable it to improve the effectiveness of an MCS in lifting liquid in a well as described. The various characteristics described above, as well as other features, will be readily apparent to those skilled in the art upon reading the following detailed description of the preferred embodiments of the invention, and by referring to the accompanying drawings. Any design feature of method described in any one embodiment of the invention may also be assumed to be applicable in any of the other embodiments described herein.

SUMMARY OF THE INVENTION

Accordingly, it is an object of the present invention to provide methods and devices to be used in conjunction with an MCS for deployment in gas, condensate or oil wells to increase the proportion of gas phase entering the MCS at its bottom entrance and to ultimately increase the MCS efficiency to lift liquid or solids. This liquid lift may include wellbore water removal for gas wells with liquid loading problems. It may further include liquid lift for solution gas drive or gas cap driven oil wells during their initial "natural flowing phase", as well as during gas re-injection or gas-lift recovery operations for oil wells, or further for steam-lifting water in geothermal wells. It may also be used for gas-lifting water in water wells. More than one MCS together with the present invention can be deployed in one well at different heights.

The device of the present invention may be attached to the bottom end of such MCS when placed in a well, with the primary purpose of increasing the percentage of the gas phase contained in the fluid entering the wellbore through the casing perforations that enters the MCS internal flow passageways as it rises in the well during production.

According to another aspect of the present invention, the device of the invention is aimed at increasing the supply of gas phase contained in the fluid entering the small tubes of the MCS entrance. The present invention provides a dedicated semi-enclosed space immediately below the MCS entrance to allow the gas phase to collect in, thereby facilitating the preferential supply of gas phase at the MCS entrance. When there is an accumulation of the gas phase inside the device of the present invention, liquid accumulated inside the MCS small tubes can leak down into such semi-enclosed space and be replaced by gas, thereby reducing the total mass of the fluid in the column. This in turn helps to reduce the pressure needed at the MCS entrance to produce liquid to the surface, providing the favorable conditions for the initial kickoff of a gas well when loaded with liquid.

According to a further aspect of the invention, when located near the bottom entrance of an MCS in a gas well, the device of the invention helps to remove the accumulated liquid from the wellbore area more efficiently and economically and therefore increase the ultimate gas recovery.

According to a further aspect of the invention, when the device of the invention is located near the bottom entrance of an MCS in an oil well, it helps in reducing the gas/liquid ratio while maintaining commercially desirable oil production levels, thereby economically extending the initial natural flowing phase of an oil well.

According to a further aspect of the invention, when the device of the invention is located near the bottom entrance of an MCS in an oil well during gas re-injection or gas-lift operations, it helps to increase the efficiency of the gas phase in lifting oil to the surface, thereby reducing the volume of gas that must be re-injected into the formation of a neighboring well or at different heights of the same well, whereby reducing production costs.

According to a further aspect of the invention, when the device of the invention is located near the bottom entrance of an MCS in a well, when one or more of the MCS tubes are used for downhole injection, the benefits of such injections will be improved. When injecting gas in such fashion to increase liquid production, the gas phase will be delivered downhole in the optimal position to improve liquid lift operations. Such optimal position may be inside the device of the invention so as to provide a high concentration of gas at the MCS entrance. When injecting treatment chemicals to dissolve waxes, paraffin, asphaltines, scale and hydrates and prevent plugging, such chemicals will be delivered in high concentration to the location of greatest need of such treatment, which is the entrance to the MCS.

According to a further aspect of the invention, when the device of the invention is located near the bottom entrance of an MCS in a well, it serves to protect the entrances to the small tubes inside the MCS from being damaged or plugged. The present invention may protect the bottom of the MCS while it is being lowered downhole and may prevent it from being caught on the seams of tubing/casing joints or other tubing surface irregularities. The present invention may prevent the MCS bottom entrance from being crushed if the MCS is lowered down onto a collar or seat nipple placed in the well. The present invention may also be used to screen incoming fluid and facilitate the removal of particulate material from the entrances to the small tubes in the event they become plugged by such material during production.

The present invention together with an MCS has compelling economic and operating advantages over other production technologies as it has no moving parts and it requires no external energy for its operation.

DETAILED DESCRIPTION OF THE INVENTION

Figure 1:
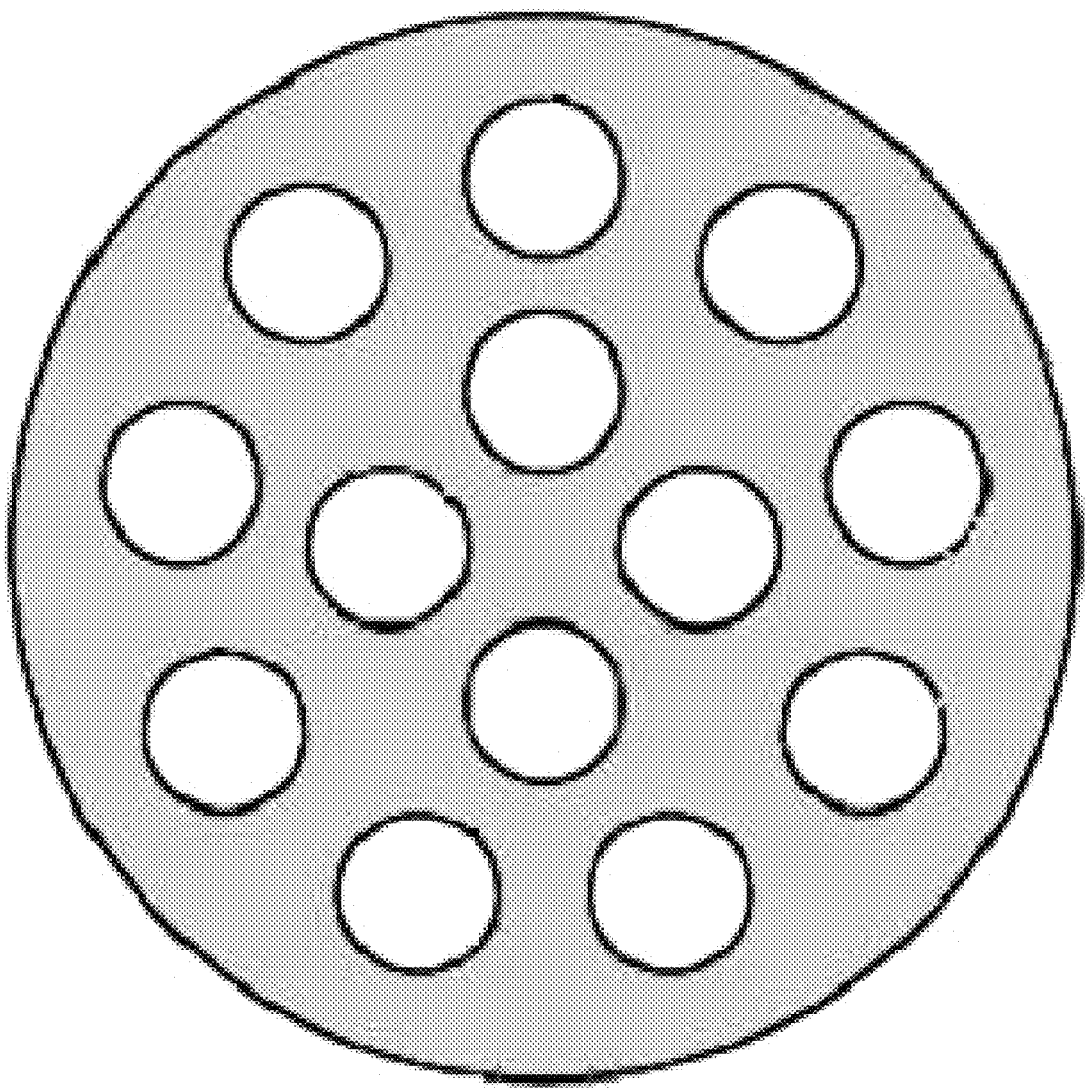
FIG. 1 shows a cross-section design for the MCS extrusion.

The present invention includes an end-piece tubular element configured to function as a gas collection sub-assembly. It may be formed together with the MCS, used as a stand-alone element, or formed together with the casing or other elements of the well. The upper end of the end-piece includes an upper opening which may be configured to be attached to the bottom end of the MCS prior to it being lowered downhole. The bottom end of the end-piece includes a bottom opening facing the incoming mixture of gas and liquid. The bottom end of the MCS may be tiered or staged, whereby at least some of the MCS passageways terminate (open) at differing heights at their respective lower ends, resulting in an MCS with more than one bottom end. An end-piece tubular element may be used in conjunction with one, some or all of these bottom ends of the MCS, and for purposes of this specification, the definition of MCS bottom shall include such tiered bottom embodiment.

The main purpose of the end-piece tubular element of the invention is to provide a phase separation function, in efforts to increase the gas/liquid ratio of the fluid entering the internal passages of the MCS. Another purpose of the end-piece is to protect the MCS entrance from damage while it is being lowered downhole. Another yet purpose of the end-piece is to provide a screening function for the flow entering the MCS to prevent its internal passageways from being clogged by debris. Another yet purpose of the end-piece is to improve the efficiency of downhole injections of gas or chemicals using individual passageways of the MCS used for such injections. The end-piece tubing element can be round or non-round and may have varying diameter or cross-section area or shape at different heights or openings of thereof. Any design elements shown or described in any one of the end-piece drawings included herein can be utilized in any combination with any of the other design elements described in any of the other referenced drawings and for either gas, condensate or oil producing wells.

Paramount to the operation of an MCS is maximization of the volume of the gas phase portion of the reservoir fluid entering the MCS internal passageways, as opposed to such gas phase going around to collect at the top of the production tubing (or casing) annulus. Increasing the proportion of gas phase in the fluid entering the MCS reduces the bulk density (total mass) of the fluid in the passageway column. This in turn increases the potential flow volume and velocity up the MCS, thereby increasing the capacity of the MCS to remove liquid from the wellbore area (satisfying Turner critical speed threshold). Compressed reservoir gas serves as the energy source for lifting liquid up the MCS passageways, expanding as it travels up the MCS as pressure declines.

Reservoir fluid entering a wellbore through the perforations is highly turbulent, and if any gas phase is present in such fluid, it is highly mixed with any liquid phase present therein, producing a fluid structure with a highly dispersed gas phase (small average gas bubble diameter/volume). In a flowing gas well having a significant amount of water accumulated in the wellbore, as the gas phase of the fluid rises up the casing or production tubing, the level of turbulence declines (due to energy dissipation) and the gas bubbles coalesce to become larger bubbles, which in turn accelerates their rise in the liquid column.

The bottom end of the MCS is preferably positioned above the reservoir perforations so that the rising gas phase will enter its internal passageways, to then flow up to the wellhead. As the gas bubbles rise, they can either enter the MCS passageways, or go around them and up the annulus (shown as position 10, FIG. 2) between MCS and the casing and/or production tubing. Given that 1) the passageways of the MCS are small (preferably 5 to 12 millimeters in diameter) and therefore more difficult for the gas to enter compared to the annulus area, and 2) that the combined cross-section area of the small MCS passageways is small relative to the annulus cross-section area, the gas phase may preferentially flow into the annulus and collect above when not employing an end-piece as described herein, leading to sub-optimal MCS performance in lifting liquid to the surface.

On the other hand, utilization of the end-piece of the invention will result in more gas entering the MCS as it rises in wellbore liquid. It will further increase the concentration of gas phase in the fluid proximate the entrance area of the MCS passageways. Such increase in the proportion of the gas phase entering the MCS is accomplished by using several methods and devices, as described herein aimed to provide a semi-enclosed region of lower turbulence allowing gas bubbles to coalesce in. The gas bubbles are then directed to rise into a region where the gas phase can collect in located just below the MCS entrance.

Figure 2:
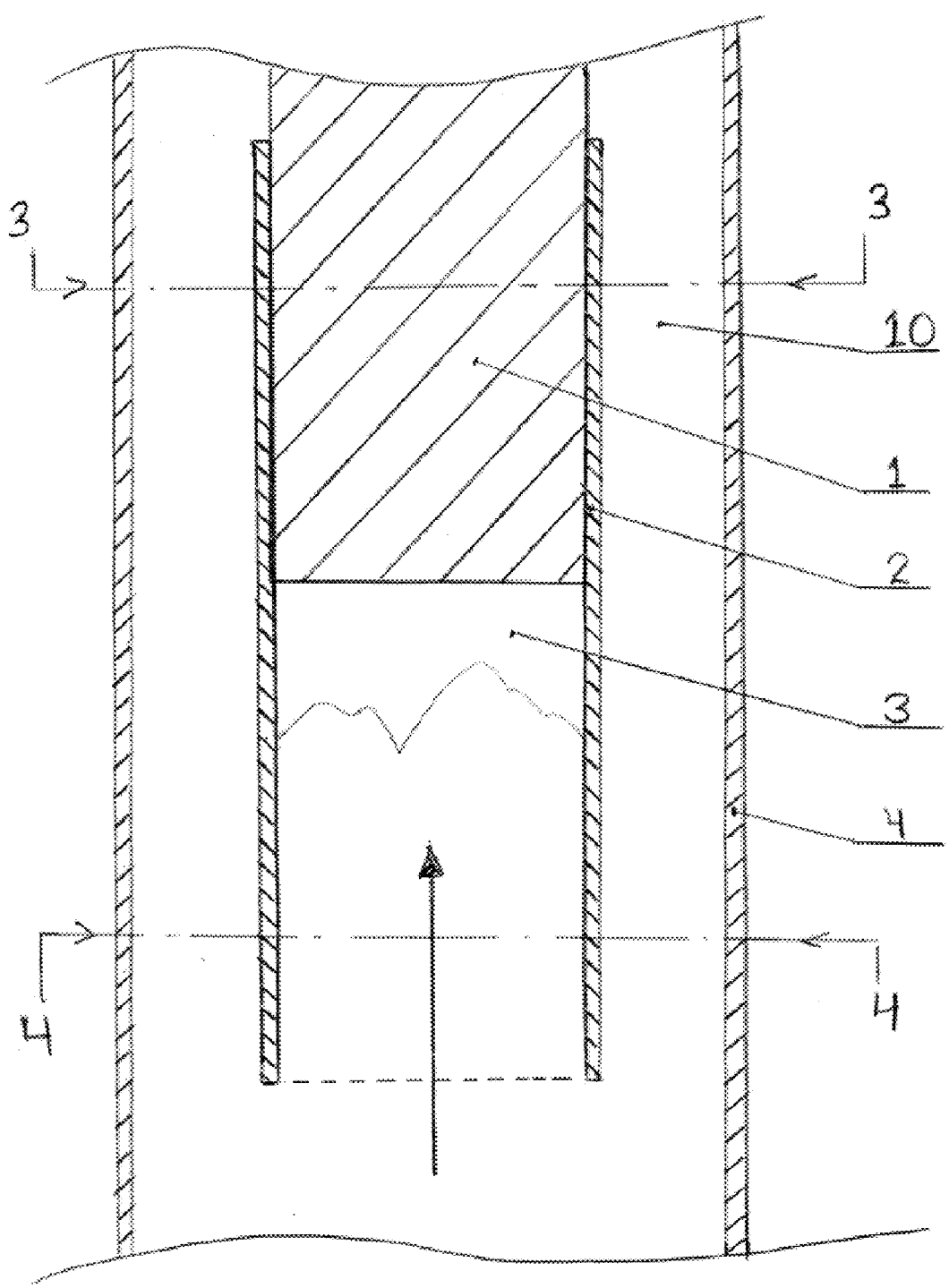
FIG. 2 shows a cross-section side view of a design of the present invention.
Figure 3:
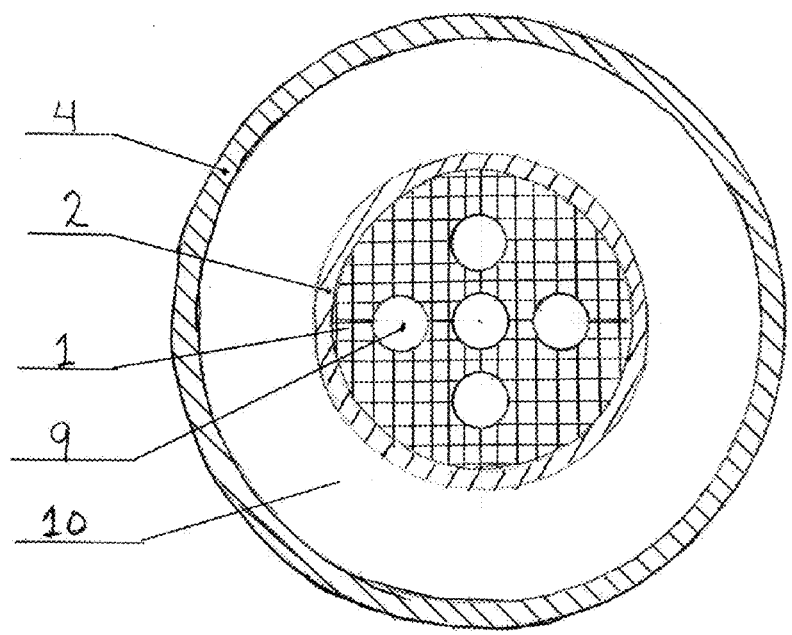
FIG. 3 shows a cross-section top view of FIG. 2.
Figure 4:
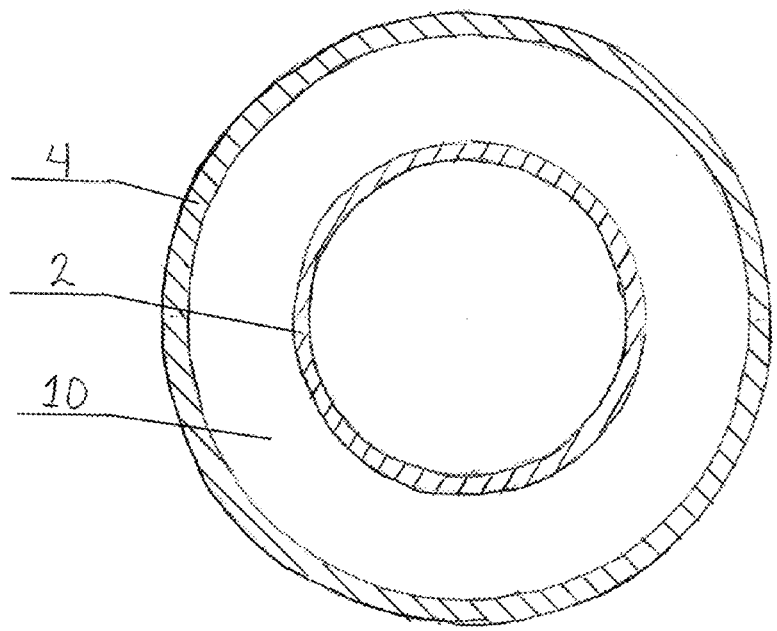
FIG. 4 shows another cross-section top view of FIG. 2.

In one design, this function can be provided by affixing an end-piece tubular element to the bottom of the MCS as shown in FIG. 2. The end-piece 2 may be a sleeve open at both ends. It is placed or bonded securely to the MCS 1 to collect rising gas in its upper region 3. In one example, the end-piece has a length that may be about at least 4 to 8 times its diameter so as to isolate the fluid near the MCS entrance from the turbulence in the fluid at the end-piece bottom opening below, and to assist in bubble coalescence and gas phase concentration at the top thereof (and at the entrance to the MCS). Such end-piece is preferably made of rigid plastic (such as rigid PVC or high-density plastic), metal or other rigid material resistant to wear, corrosion, damage, etc. Such affixed end-piece may protect the bottom end of the MCS from being damaged or its passageways clogged while being lowered downhole. An optional bevel cut on the bottom outside edge of such end-piece (not shown) may further reduce a potential for the MCS to be caught or stuck in the well while being lowered downhole. An optional screen may be bonded/affixed to the end-piece entrance, exit or mid-section (not shown) to prevent the small MCS passageways 9 (FIG. 3) from getting clogged by debris contained in the incoming fluid. Generally, pore size of said screen is preferably about one half that of the cross section of the small internal passageways comprising the MCS to screen particles that may be less round or less-square and potentially clog such passageways. Pore size may also be varied to accommodate the individual characteristics of the particulates produced by a specific well, with smaller pores for particulates with high length to width ratio. At the same time, small particulates like sand are preferably allowed through the screen and are produced at the surface along with the liquids, which may thereby prevent the accumulation of sand in the wellbore.

Providing a semi-enclosed space for the gas phase to collect in immediately below the MCS entrance may be particularly important in achieving a successful "kick off" of a gas well, i.e. to initiate upward gas/liquid flow in the MCS after MCS installation or after the well operation has been stopped (allowing liquid to collect at the bottom). Typically, when installing an MCS in a gas well, gas production will be "killed" by adding water to the well, increasing backpressure on the formation, or preferably, the well can be opened to atmosphere (blown down) so that gas flow is sufficiently declined to allow installation of the MCS.

To initiate kickoff after the MCS is installed and the wellhead plumbing completed, preferably only the MCS flow pathway is left opened at the surface (e.g. to atmosphere). If production was not "killed" by adding water to the production tubing, the well will quickly "pressure up" with the ingress of reservoir fluid through the perforations. Incoming gas in such fluid will rise in the liquid accumulated in the well and a portion may collect inside the end-piece affixed to the entrance of the MCS. Assuming in one example a diameter of about 5 to 12 millimeters for the individual MCS passageways and that the lower region of the passageways may be occupied initially by 100% liquid phase, the buoyant gas volume collected at the MCS entrance by the end-piece may slowly diffuse (the smaller the MCS passageway diameter, the slower the diffusion rate) into the MCS passageways. Liquid has greater density than gas, so liquid will fall and gas will rise at the interface between the MCS entrance and the top of the end-piece in the generally stagnant conditions prior to kickoff (i.e. no pressure-driven flow up the MCS, so equivalent pressures exist at the MCS tubing entrances vs. top of the end-piece). Such gas then may rise within each small-diameter passageway (slippage of the gas phase past the liquid phase), resulting in the liquid in the MCS leaking down into the end-piece and being replaced by gas.

In essence, the semi-enclosed area at the top of the end-piece accumulates the gas phase maintained at a height of at least 3 inches in the top of the end-piece during kickoff to minimize liquid entry into the passageways. In other words, it functions as a fluid exchange mechanism allowing the heavier liquid phase to leak down from the MCS passageways into the semi-enclosed space of the end-piece. Such liquid will ultimately join the liquid below in the end-piece while the height of the accumulated gas phase at the top of the end-piece is preserved (provided that additional gas is continuously fed from below). Having such accumulated gas phase at the MCS entrance ensures that it is the gas phase that replaces such leaking liquid, resulting in a process where the total mass of the fluid in the column continues to decline as such leakage of liquid continues from the MCS passageways into the end-piece.

The rise of wellbore pressure (while pressuring up the well) combined with a sufficient reduction in the bulk density of the gas-liquid mixture in the MCS passageway columns create favorable conditions to initiate well "kickoff". Once the MCS-produced gas develops sufficient velocity, most liquid may be evacuated from the well allowing the production of commercially attractive volumes of gas. Optionally, gas production can be increased further by producing gas through the casing or annulus (shown as position 10, FIG. 2), preferably using a valve at the surface that allows production only when a specified pressure level is exceeded. Increasing the gas/liquid ratio in the MCS columns in such a way lowers the bulk density of the fluid in each individual column, thereby reducing the minimum wellbore pressure required to produce gas, increasing its ultimate recovery.

If the well is "killed" by adding water to the well before MCS installation, utilization of a end-piece becomes even more necessary for "kick off" so as to remove the excess water volume. Gas may be slowly bled out of the casing (or the casing pressure reduced using a compressor) at the surface to induce greater flow into the well through the perforations to provide a source of gas to flow into the end-piece to "kickoff" the well.

One important aspect of the end-piece is to isolate the semi-enclosed area near the entrance to the MCS passageways from the turbulence produced by the reservoir fluid entering the wellbore through the perforations. This is done so that gas phase can collect in the area immediately below the bottom end of the MCS and preferentially enter the MCS passageways. The objective of concentrating the gas phase and reducing turbulence at the entrance to the MCS can be accomplished using a number of novel design elements of the invention.

The fluid flow just above the reservoir perforations is characterized as highly turbulent churn flow. One design of the end-piece includes a length of tubing tightly secured onto the lower end of the MCS (see FIG. 2) with its bottom end left open. The end-piece may be preferentially located such that its bottom end (the fluid entrance) may be proximate and even adjacent the perforations in the well (such as in 2 to 20 feet therefrom). Generally speaking, the lower in the well that the MCS entrance is employed, the lower will be the resulting height of wellbore liquid (reducing backpressure on the formation, thereby increasing flow volume). At this height in the well, the flow is highly turbulent. As the buoyant gas phase enters the end-piece and rises in it, such turbulence gradually subsides (subsiding after approximately traveling a length equal to about 4 to 10 diameters of the end-piece). The length of the end-piece section in which the turbulence is generally reduced depends on the initial level of turbulence at the entrance, the flow rate up the end-piece and the design of the end-piece elements. Increased isolation of the fluid flow from the bottom turbulence is assisted by a relatively low bulk velocity of the fluid flowing up the end-piece and into the MCS. Therefore, the total working length of the end-piece may be estimated by the length of a semi-enclosed area for gas segregation/concentration of about at least 4 to 10 times the end-piece diameter and adding to that an additional length required to calm the turbulence of the fluid of another 4 to 10 diameters of the end-piece (or cross-sectional dimensions in case the end-piece is not round). This makes the length of the end-piece in one embodiment at or above about 8 to 20 diameters thereof. Nevertheless, it should be noted that any length of end-piece, even as small as about one inch, is preferable to no end-piece at all in efforts to increase the gas/liquid ratio entering the MCS.

Additional methods and devices can be utilized to reduce the turbulence in the fluid entering the end-piece more effectively than simply extending the length of thereof. Various flow-redirecting and flow-confining elements (vanes, holes, etc.) can be placed inside the end-piece to assist in reducing the level of turbulence, to better isolate the semi-enclosed area just below the MCS entrance from the turbulence of entering fluid, and to improve conditions for the development of an accumulation of gas phase. Turbulence subsides more quickly when the fluid is confined in more narrow passages as it travels up the end-piece, so inserts which segment the flow or create a labyrinth or more tortuous pathway for the fluid will tend to reduce turbulence in the end-piece, producing conditions more conducive for concentrating the gas phase at the MCS entrance.

Figure 5:
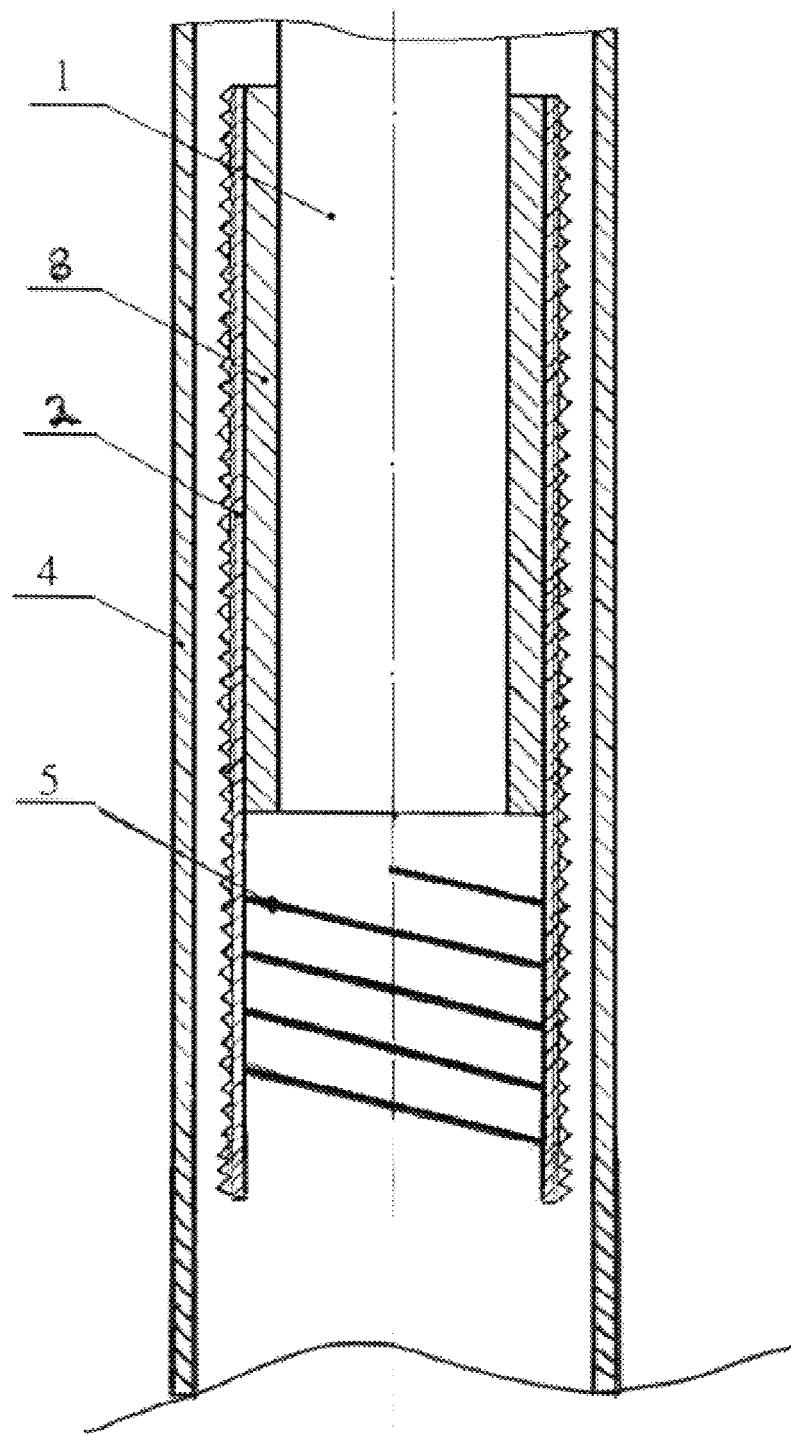
FIG. 5 shows a cross-section side view of another design of the present invention.

In one design, the end-piece has a spiral insert having the shape of an auger. In one embodiment it may be placed in a sealed contact (at the outer edge of the spiral) with the inside wall of the end-piece while in other designs it may form an annular passage between thereof and the end-piece. As shown in FIG. 5, an MCS 1 is placed in a well production tubing or casing 4. The MCS may be equipped with a transition bushing 8 attached or bonded to its bottom end. The bushing 8 retains an end-piece 2 attached thereto and extending below the MCS. The outer edge of the spiral-shaped insert 5 is attached (preferably without any gaps) to the inside surface of the end-piece in its lower section. The labyrinth nature of flow produced by such spiral-shaped insert serves to reduce turbulence as the gas phase in it rises in the end-piece. The ability of the gas phase to slip past the liquid phase is hereby improved given the lateral direction of flow (slippage of the gas phase past the liquid phase is higher in non-vertical conduits). As illustrated in FIG. 5, it is not necessary for the spiral-shaped insert to extend the full length of the lower section of the end-piece.

According to one method of the invention, an increase in the proportion of the gas phase rising from the perforations and entering the end-piece is accomplished by increasing the size of the end-piece entrance. As shown in FIG. 5, bushing 8 provides a larger diameter surface for attachment of the end-piece 2 to the MCS 1, resulting in a larger-diameter entrance to the end-piece. This allows increasing the end-piece portion (or ratio) of the cross-sectional area of the outer tubing containing the entire rising fluid flow, thereby increasing the relative volume of the rising gas phase in liquid that will enter the end-piece and MCS.

In another embodiment, the outer surface of the end-piece 2 has significant roughness as shown in FIG. 5, preferably a saw tooth (or pipe thread) surface, such roughness employed to increase flow resistance of the rising fluid flow to enter into the annulus area, further encouraging the rising flow into the end-piece.

In another design (see FIG. 6), a labyrinth can be formed using one or more ring-shaped inserts 5 attached to the inside surface of the end-piece 2 and designed to assist in phase separation. These ring-shaped inserts may have the same or different diameters. In one embodiment, the diameters of the ring-shaped inserts are selected to alternate from narrow to wide and back to narrow. These inserts may further be provided with leakage holes 7 designed to allow flow therethrough. In yet another embodiment, the ring-shaped inserts may not cover the entire periphery of the end-piece, as they can be formed as disc segments (i.e. half circular, or preferably more than half), some disks may be overlapping each other. Leakage holes (7) may also be formed in such disks for allowing the liquid phase to travel down the end-piece.

Figure 6:
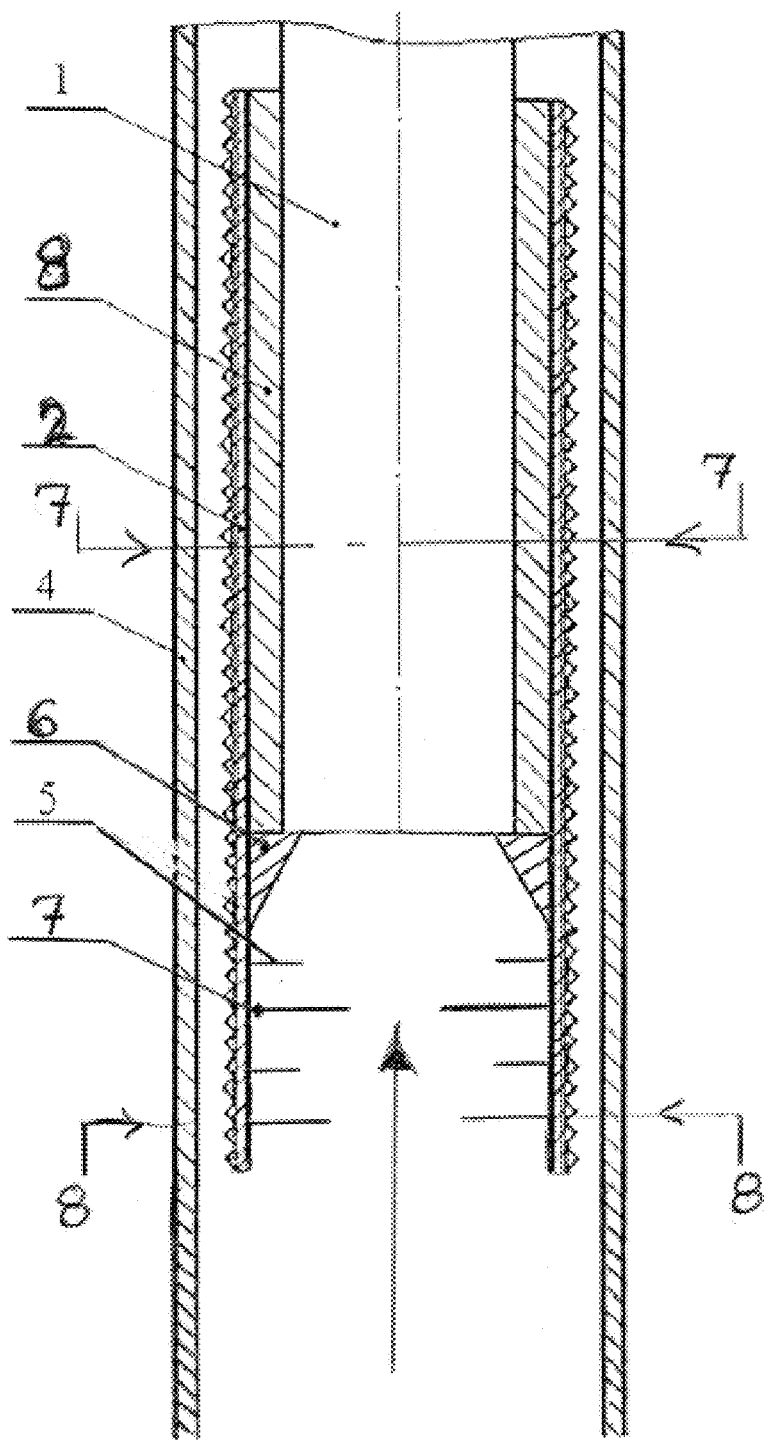
FIG. 6 shows a cross-section side view of another design of the present invention.
Figure 7:
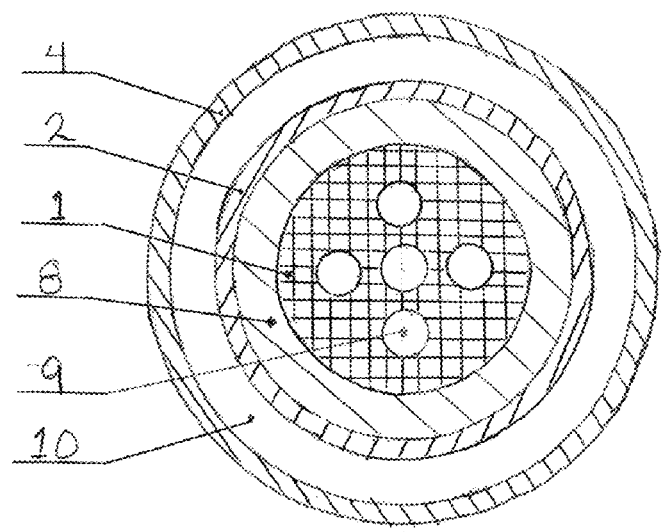
FIG. 7 shows a cross-section top view of FIG. 6.
Figure 8:
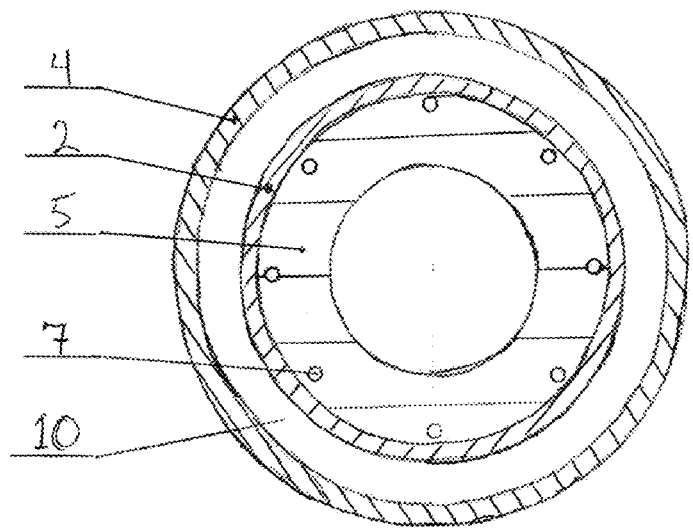
FIG. 8 shows another cross-section top view of FIG. 6.

Optionally, the bottom inside edge of the bushing element may be beveled (not shown). In another embodiment, as shown in FIG. 6, a ring-shaped tapered insert 6 with a similar beveled edge can be attached to the end-piece to further reduce the diameter of the end-piece just below the MCS passageway entrances and provide a better bonding surface for the MCS to the end-piece. Such tapered insert 6 may be further used to better control execution of the bonding operation of the MCS to the end-piece and ensuring that the specified length of the MCS is bonded to the end-piece, given that such bonding will likely be performed by field personnel at the well site.

Figure 9:
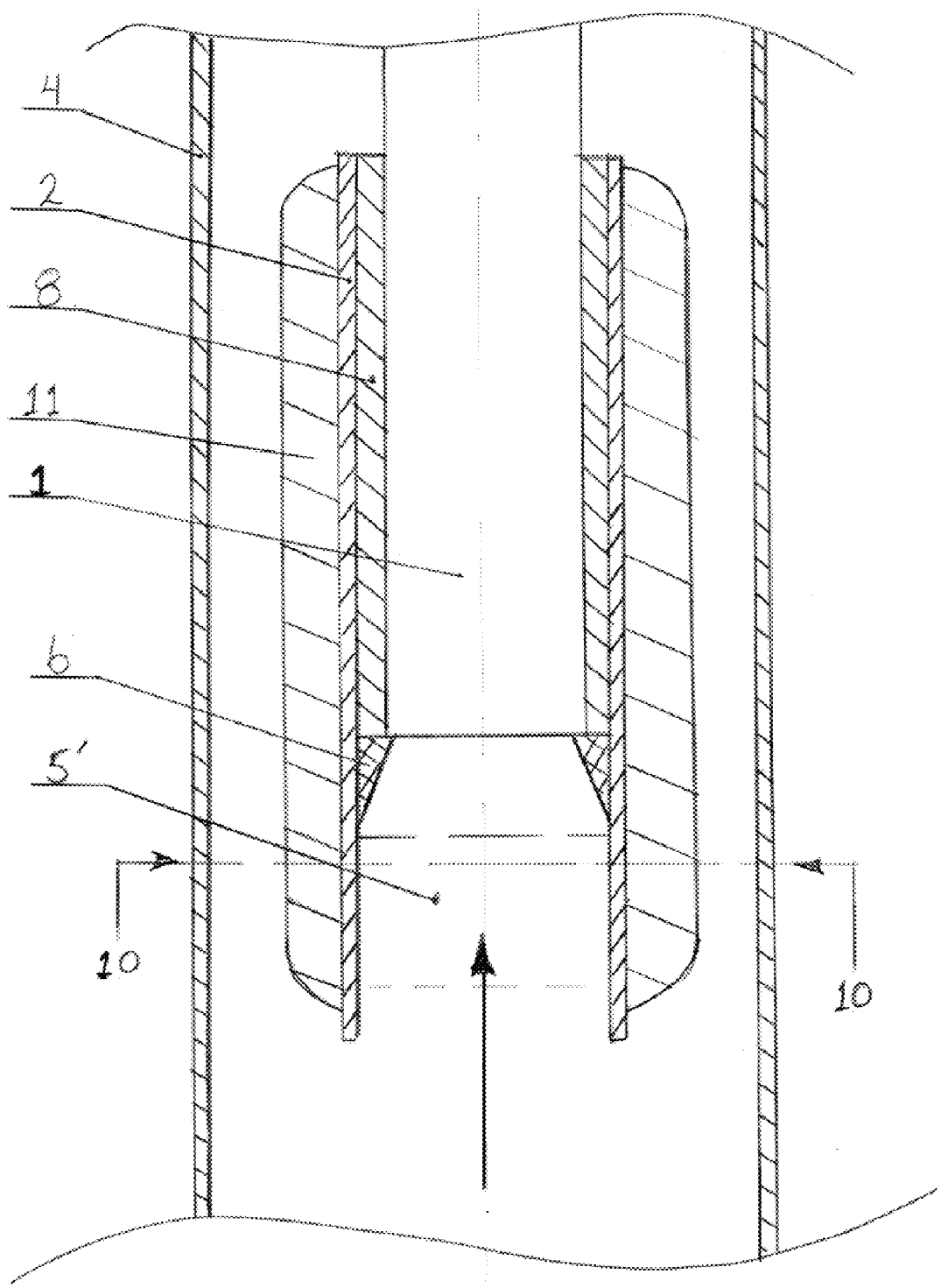
FIG. 9 shows a cross-section side view of another design of the present invention.
Figure 10:
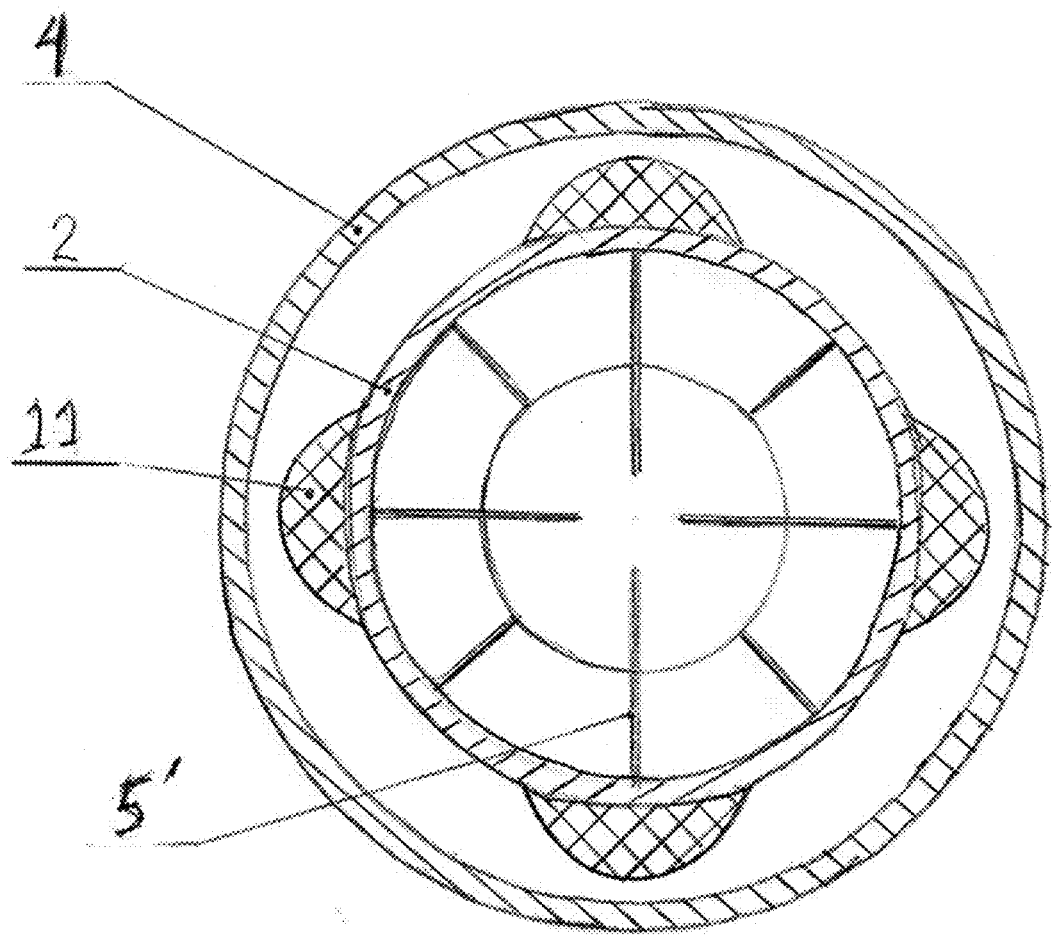
FIG. 10 shows a cross-section top view of FIG. 9.

In another design shown in FIG. 10 for top view of the design in FIG. 9, a series of internal flow-directing elements such as vertically inclined vanes 5' are attached/bonded to the inside of the end-piece 2 and extend generally from the perimeter towards the inside of flow in the end-piece. Such vanes may optionally not all extend fully to the center of the end-piece. They may be further combined together with one or more generally concentric tubing elements as shown. Optionally, spaced apart external bumpers 11 are attached to the outer surface of the end-piece 2 as shown. These bumpers 11 are designed to help limiting lateral movement of the end-piece inside the casing and keep the end-piece towards the center of the well. They also absorb vibrations in the event of contact between the end-piece and the production tubing or casing when turbulence in the proximate fluid induces sideways movement of the end-piece. A further purpose for these bumpers is to reduce the cross-section area of the annulus available for fluid flow so as to further encourage fluid to enter the end-piece.

It is therefore to be understood that numerous modifications may be made to the illustrative embodiments and that other arrangements may be devised without departing from the spirit and scope of the present invention as defined by the appended claims.

We claim:

1. An end-piece for a multi-channel system positioned in a reservoir well, said multi-channel system having a bottom entrance and a plurality of passageways configured to transport a multi-phase flow including at least a gas phase from said reservoir along said well, said multi-channel system extending from a top portion of said well to location of liquid accumulation, said end-piece comprising a sleeve extending from said bottom entrance towards said reservoir to direct said multi-phase flow towards said bottom entrance of said multi-channel system, said end-piece including a semi-enclosed space opened towards said reservoir, said space sized to increase proportion of said gas phase in said multi-phase flow, whereby deployment of said multi-channel system equipped with said end-piece prevents liquid accumulation in said well.

2. The end-piece as in claim 1, wherein said sleeve is equipped with a screen sized to prevent debris from entering said passageways of said multi-channel system.

3. The end-piece as in claim 1, wherein said well is selected from a group consisting of a gas well, an oil well, a condensate well, a geothermal well, and a water well.

4. The end-piece as in claim 1, wherein said sleeve is characterized by a sleeve length and a sleeve diameter, a ratio of said length to said diameter being at least 4 or greater.

5. The end-piece as in claim 1, wherein said sleeve having an opening facing said reservoir, said sleeve further having a cross-sectional size near said opening being greater than a cross-sectional size of said multi-channel system at said bottom entrance thereof.

6. The end-piece as in claim 1 further including internal flow-directing elements, said elements sized, positioned and oriented so as to reduce turbulence in said multi-phase flow coming from said reservoir towards said multi-channel system.

7. The end-piece as in claim 1, wherein said end-piece further equipped with a plurality of spaced out external bumpers so as to keep said end-piece towards the center of said well.

8. An end-piece for a multi-channel system positioned in a well extending from a reservoir, said multi-channel system having a plurality of passageways extending from a bottom entrance facing said reservoir, said multi-channel system configured to transport a multi-phase flow including a gas phase from said reservoir along said well, said multi-channel system extending from a top portion of said well to location of liquid accumulation, said end-piece comprising a sleeve extending from said bottom entrance towards said reservoir to direct said multi-phase flow towards said bottom entrance of said multi-channel system, said sleeve being at least equal or greater in cross-section than said multi-channel system so as to concentrate said gas phase in said multi-phase flow, whereby deployment of said multi-channel system equipped with said end-piece prevents liquid accumulation in said well.

9. The end-piece as in claim 8, wherein said sleeve is equipped with a screen sized to prevent debris from entering said passageways of said multi-channel system.

10. The end-piece as in claim 8, wherein said well is selected from a group consisting of a gas well, an oil well, a condensate well, a geothermal well, and a water well.

11. The end-piece as in claim 8, wherein said sleeve is non-round.

12. The end-piece as in claim 8, wherein said sleeve is characterized by a sleeve length and a sleeve diameter, a ratio of said length to said diameter being at least 4 or greater.

13. The end-piece as in claim 8, wherein said sleeve having an opening facing said reservoir, said sleeve further having a cross-sectional size near said opening being greater than a cross-sectional size of said multi-channel system at said bottom entrance thereof.

14. The end-piece as in claim 8 further including internal flow-directing elements, said elements sized, positioned and oriented so as to reduce turbulence in said multi-phase flow coming from said reservoir towards said multi-channel system.

15. The end-piece as in claim 8, wherein said end-piece further equipped with a plurality of spaced out external bumpers so as to keep said end-piece towards the center of said well.

16. The end-piece as in claim 8, wherein at least some passages of said multi-channel system terminate at different heights defining a plurality of bottom entrances, said end-piece comprising at least one sleeve extending from at least one bottom entrance of said multi-channel system.

17. The end-piece as in claim 16 comprising a plurality of sleeves extending from at least some of said bottom entrances of said multi-channel system.

18. A method for increasing liquid lift in a well extending from a reservoir, the method comprising the following steps:
 a. providing a multi-channel system positioned in said well to divide a multi-phase flow from said reservoir into a plurality of individual flows, said multi-phase flow including a gas phase, said multi-channel system extending from a top portion of said well to location of liquid accumulation, said multi-channel system having a bottom entrance facing said reservoir, and
 b. increasing a proportion of said gas phase in said multi-phase flow near said bottom entrance.

19. The method as in claim 18, wherein said step (b) including restricting or preventing said gas phase from entering an annular space between said multi-channel system and said well.

20. The method as in claim 18, further including a step of reducing turbulence in said multi-phase flow near said bottom entrance of said multi-channel system.

21. The method as in claim 18, wherein said step (b) further including providing a semi-enclosed space near said bottom entrance to promote coalescence of bubbles in said gas phase.

* * * * *